United States Patent [19]
Ryon et al.

[11] Patent Number: 5,208,986
[45] Date of Patent: May 11, 1993

[54] FOLDING BUCKSAW

[76] Inventors: Randall C. Ryon, 36 Alina St., Fairport, N.Y. 14450; Richard M. Baran, 1262 Conifer Cove La., Webster, N.Y. 14580

[21] Appl. No.: 803,519

[22] Filed: Dec. 9, 1991

[51] Int. Cl.⁵ .................. B27B 21/02; B27B 21/00; A44B 21/00
[52] U.S. Cl. ........................ 30/506; 30/512; 24/455
[58] Field of Search .................. 30/512, 506; 7/144; 24/455

[56] References Cited

U.S. PATENT DOCUMENTS

| | | | |
|---|---|---|---|
| 1,290,528 | 1/1919 | Ehrlich | 7/149 |
| 1,565,861 | 12/1925 | McIntire | 30/512 |
| 2,194,494 | 3/1940 | Carroll | 30/506 |
| 2,595,288 | 5/1952 | Peters | 50/512 |
| 2,930,420 | 3/1960 | Brion | 30/512 |
| 4,376,456 | 3/1983 | Jacoff | 30/506 |
| 4,913,204 | 3/1990 | Moores | 30/374 |
| 5,074,002 | 12/1991 | Huang | 30/512 |

FOREIGN PATENT DOCUMENTS 2125477 3/1984 United Kingdom ............... 24/455

Primary Examiner—Douglas D. Watts
Assistant Examiner—Paul M. Heyrana, Sr.
Attorney, Agent, or Firm—Robert J. Bird

[57] ABSTRACT

A foldable bucksaw includes an elongated hollow box frame, which is also a blade storage sheath, with left and right handles connected by over center hinges to the ends of the box frame for movement between storage position and operative position. A screw mechanism on one handle is connected to the sawblade to tighten and loosen it. The screw mechanism includes an adjusting screw mounted on the handle and a tensioner nut for connection to the blade. The tensioner nut includes a central threaded aperture, a blade mount portion below it to position the sawblade in line with the adjusting screw, and an upper portion for extension into said saw handle to prevent the tensioner nut from rotating when the adjusting screw is rotated and while the blade is in use.

3 Claims, 3 Drawing Sheets

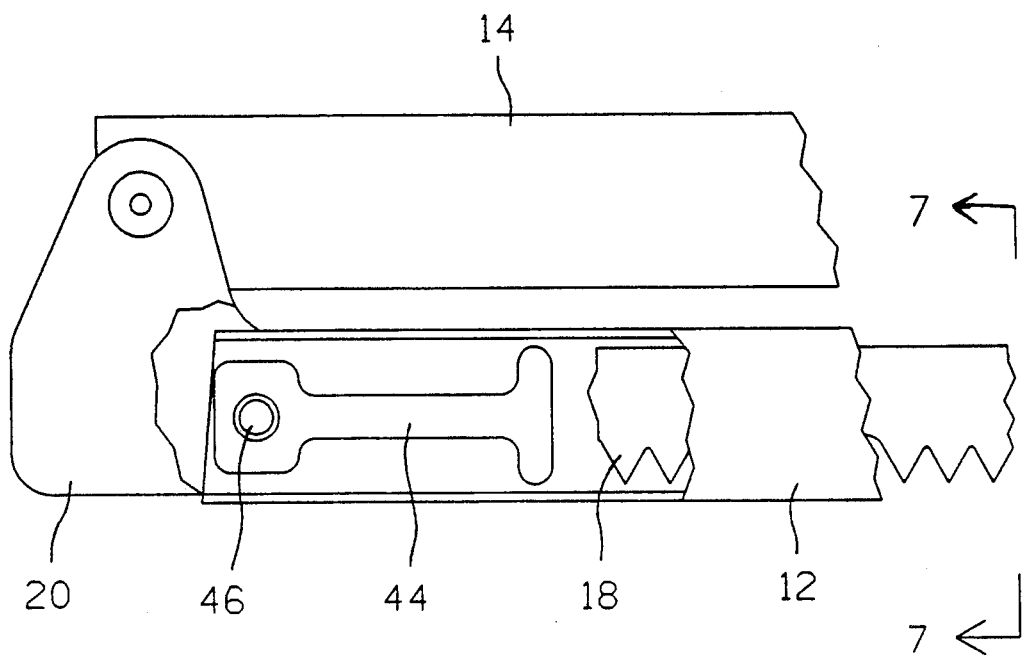
FIG. 5
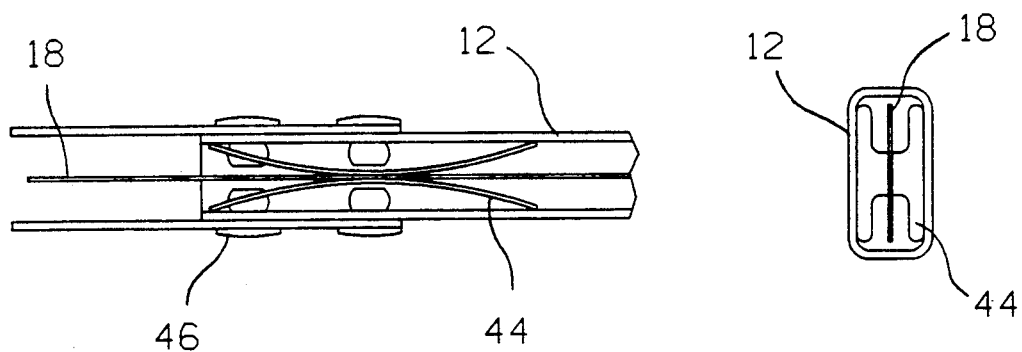 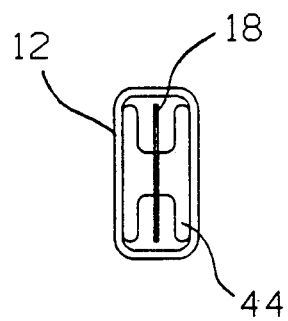
FIG. 6  FIG. 7

FOLDING BUCKSAW

TECHNICAL FIELD

This invention is a woodcutting saw, or bucksaw, which is collapsible and foldable into a compact portable unit.

BACKGROUND ART

Collapsible saws are known in the prior art. The following United States patents are the most relevant prior art that I know of:

U.S. Pat. No. 3,149,652 issued to Swenson discloses a saw with a channel frame, a tubular handle, and a sawblade. The assembled saw is triangular in form. To collapse the saw, the handle slips transversely off the channel frame, the blade swings into storage position within the channel frame, and the handle then slips longitudinally over the channel frame and blade.

U.S. Pat. No. 4,580,344 issued to Jinghage discloses a saw with a channel frame, a hinged handle, and a sawblade. The assembled saw is triangular in form. To collapse the saw, the blade disconnects from the handle and swings into storage position within the channel frame, and the handle then swings on its hinge to a position alongside the frame.

DISCLOSURE OF THE INVENTION

The present invention is a foldable bucksaw including an elongated hollow box frame, which is also a blade storage sheath, left and right handles connected to it by over center hinges for movement between storage positions and operative positions. A screw mechanism on one handle is connected to the sawblade to tighten and loosen it. The screw mechanism includes an adjusting screw mounted on the handle and a tensioner nut for connection to the blade. The tensioner nut includes a central threaded apeture, a blade mount portion below it to position the sawblade in line with the adjusting screw, and an upper portion for extension into the saw handle to prevent the tensioner nut from rotating when the adjusting screw is rotated and while the blade is in use.

BRIEF DESCRIPTION OF THE DRAWINGS

FIG. 5 is an enlarged detail from FIG. 2.

FIG. 6 is a transverse section on the plane 6—6 of FIG. 2.

FIG. 7 is a transverse section on the plane 7—7 of FIG. 5.

BEST MODE FOR CARRYING OUT THE INVENTION

Figure 1:
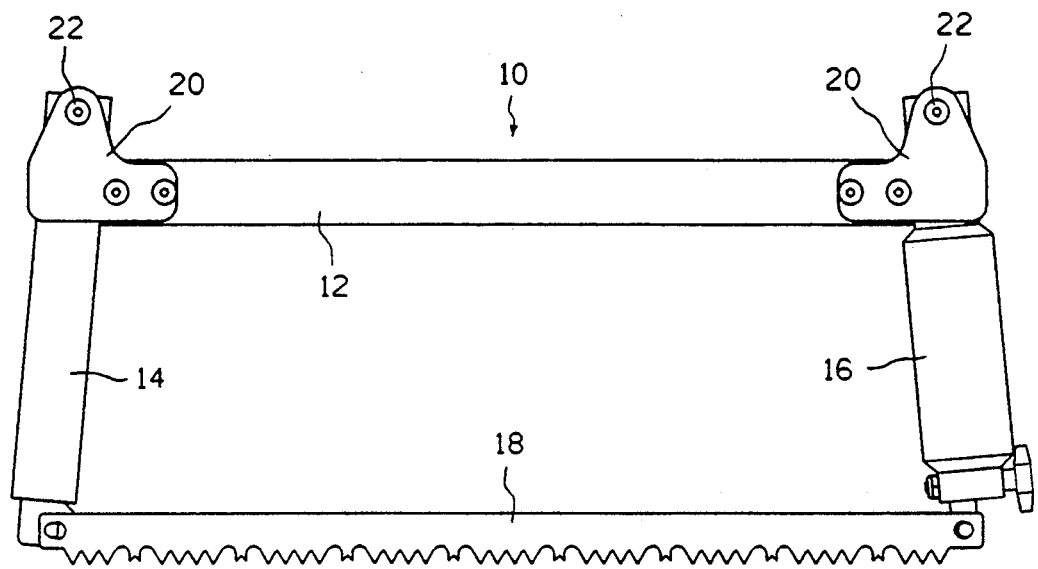
FIG. 1 shows an assembled saw according to this invention.
Figure 2:
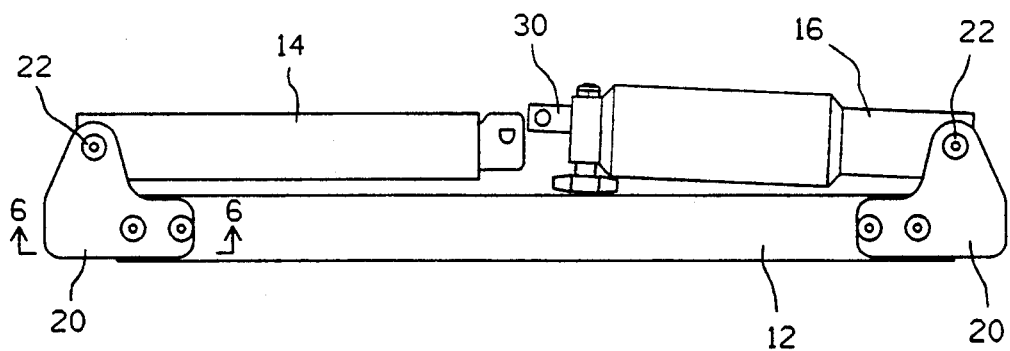
FIG. 2 shows the saw in a folded configuration.

Referring to FIGS. 1 and 2, the saw 10 of this invention includes a box frame 12, a left handle 14, a right handle 16, and a sawblade 18 removably connected to the lower ends of the handles 14 and 16. The handles 14 and 16 are connected to the box frame 12 by over-center hinges 20 on hinge pins 22. The hinges 20 permit movement of the handles 14 and 16 between operating positions generally perpendicular to the box frame 12 as shown in FIG. 1, and storage positions lying along the box frame 12 as shown in FIG. 2. The box frame 12 abuts against the handles 14 and 16, below their hinge pins 22, to define a stop or limit to their inward swing. The right handle 16 includes padding 42 for shock absorption and thermal insulation.

The box frame 12 is hollow and rectangular in cross section, as shown in FIG. 7. The handles 14 and 16 are also hollow and rectangular in cross section. Back to FIG. 1, the sawblade 18 is a standard blade with mounting holes at each end for connection to the saw. The blade 18 is connected to the lower end of the handle 14 by a fastening pin 38.

Figure 3:
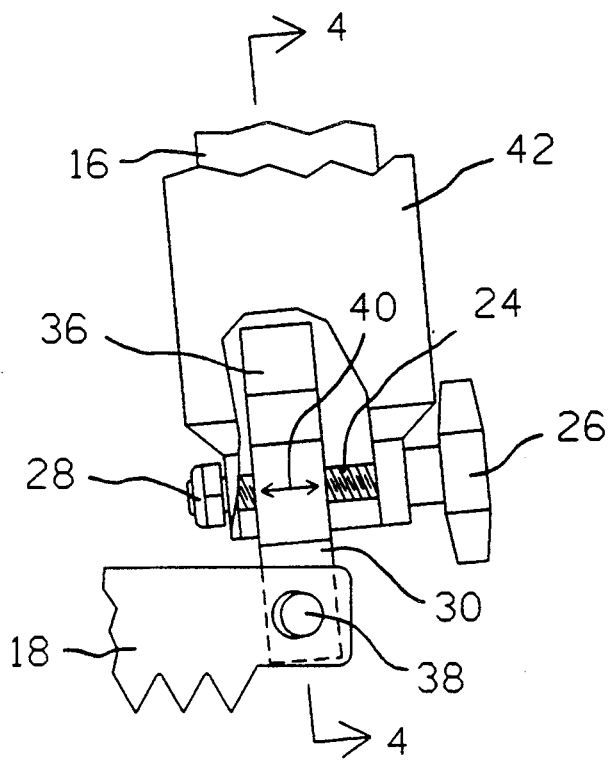
FIG. 3 is an enlarged detail from FIG. 1.
Figure 4:
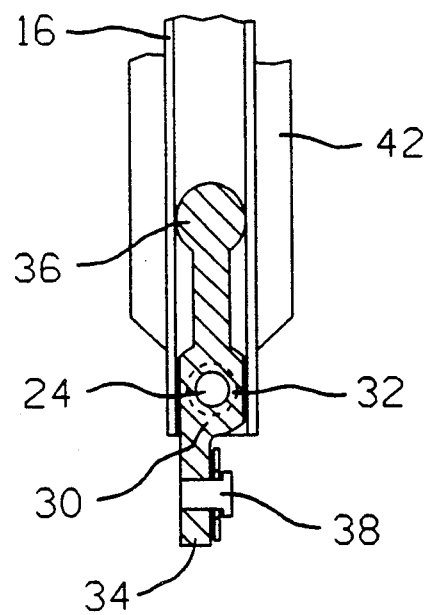
FIG. 4 is a transverse section on the plane 4—4 of FIG. 3.

Reference is now to FIGS. 3 and 4. FIG. 3 is an enlarged detail of the right handle 16, and FIG. 4 a sectional view as from the left of FIG. 3. An adjusting thumbscrew 24 extends transversely through the lower end of the handle 16. The thumbscrew 24 includes a grip 26 at one end for manual operation, and a locknut 28 at the other end to secure the thumbscrew on the handle 16. The thumbscrew 24 is threaded through a tensioner nut 30 to which the blade 18 is mounted.

The tensioner nut 30 includes an aperture 32 through its central portion, a blade mount portion 34 below the aperture 32, and an upper portion 36 above the aperture 32. The central aperture 32 is threaded to receive the thumbscrew 24. The blade mount portion 34 includes a fastening pin 38 for connection to the sawblade 18. The fastening pin 38 aligns the blade 18 with the axis of the thumbscrew 24. The upper portion 36 of the tensioner nut is located within the hollow handle 16 with a limited clearance, as shown in FIG. 4. Turning the thumbscrew 24 moves the tensioner nut 30, in the directions of the arrow 40 in FIG. 3, to either tighten or loosen the sawblade. When the thumbscrew 24 is turned, the upper portion 36 of the tensioner nut abuts one side or the other of the handle 16. This prevents the tensioner nut 30 from rotating, thereby preventing the blade 18 from twisting, with rotation of the thumbscrew 24 and while the blade is in use.

The assembled saw in FIG. 1 is a taut and rigid assembly. To disassemble the saw, the blade 18 is removed and the hinged handles 14 and 16 folded up and around to make a very compact storage package. The hollow box frame 12 is also a blade storage sheath, and one or more blades are held within the box frame by a spring clip, magnet, chicane, or screws. FIGS. 5, 6, and 7 illustrate the preferred blade storage system. Spring clips 44 inside both ends of the box frame 12 guide the blade 18 into the sheathed position and secure it in place by friction. The spring clips 44, where they contact the blade 18, are narrow strips to avoid the teeth of the sawblade. The spring clips 44 are easily installed at assembly without additional hardware. They are positioned or located inside the box frame by the hinge plate rivets 46. They are not riveted in place.

To reassemble the saw, a blade is removed from the box frame, the handles folded down into position, and the blade hooked to the ends of the handles and tensioned by the thumbscrew and tensioning mechanism. It might be desired to store within the box frame a number of special purpose blades, such as blades for bone or metal cutting, or a plain knife blade.

The prior art saws discussed above are of triangular configuration, and have open channel frames which they require because their blades swing into the channel frame for storage. The box frame of the saw of this invention is stronger than the open channel frame of the prior art saws.

The configuration of the saw, which is quadrilateral rather than triangular, makes maximum use of the entire blade length on large diameter cuts, which triangular saws cannot do. It also offers two-handed operabililty. The angle of the handles relative to the blade is such that the saw does not dive into the cut as the triangular frame saws tend to do.

The lightweight folding bucksaw of this invention is a handy and portable tool particularly advantageous for camping, backpacking, canoeing, and the like, in addition to standard pruning work at home.

The foregoing description of a preferred embodiment of this invention, including any dimensions, angles, or proportions, is intended as illustrative. The concept and scope of the invention are limited only by the following claims and equivalents thereof.

What is claimed is:

1. A foldable bucksaw, including:
   an elongated hollow box frame forming a sawblade storage sheath;
   left and right hollow handles pivotally connected to the ends of said box frame for movement between storage positions along said box frame and operative positions extending transversely of said box frame;
   a sawblade removably connected to the lower ends of said handles;
   an adjusting thumbscrew rotatably mounted on the lower end of said right handle, said thumbscrew threaded to and captively engaging a tensioner nut between walls of said right handle;
   said tensioner nut including a central threaded portion for engagement with said thumbscrew, a depending blade mount portion adapted for attachment to said sawblade, and an upper portion extending upward into said hollow right handle to prevent rotation of said tensioner nut with rotation of said thumbscrew;
   a first pair of opposed inwardly convex centering spring clips biased against each other within one end of said box frame, and a second pair of opposed inwardly convex centering spring clips biased against each other within the other end of said box frame, said spring clips effective to guide said sawblade along the interior of said frame and to engage said sawblade for storage thereof;
   said spring clips each including end flanges biased against an interior wall of said frame, and a connecting web portion extending inward from said wall, said web portions of opposed spring clips biased against each other midway between the walls of said frame, said spring clips thereby effective to avoid the teeth of said sawblade when it is moved therealong.

2. A foldable bucksaw, including:
   an elongated hollow box frame forming a sawblade storage sheath;
   left and right hollow handles pivotally connected to the ends of said box frame for movement between storage positions along said box frame and operative positions extending transversely of said box frame;
   a sawblade removably connected to the lower ends of said handles;
   an adjusting thumbscrew rotatably mounted on the lower end of said right handle and operatively connected to said sawblade to tighten and loosen said sawblade;
   a first pair of opposed inwardly convex centering spring clips biased against each other within one end of said box frame, and a second pair of opposed inwardly convex centering spring clips biased against each other within the other end of said box frame, said spring clips effective to guide said sawblade along the interior of said frame and to engage said sawblade for storage thereof;
   said spring clips each including end flanges biased against an interior wall of said frame, and a connecting web portion extending inward from said wall, said web portions of opposed spring clips biased against each other midway between the walls of said frame, said spring clips thereby effective to avoid the teeth of said sawblade when it is moved therealong.

3. A foldable bucksaw, including:
   an elongated hollow box frame forming a sawblade storage sheath;
   left and right hollow handles pivotally connected to the ends of said box frame for movement between storage positions along said box frame and operative positions extending transversely of said box frame;
   a sawblade removably connected to the lower ends of said handles;
   an adjusting thumbscrew rotatably mounted on the lower end of said right handle and operatively connected to said sawblade to tighten and loosen said sawblade;
   a first pair of opposed inwardly convex centering spring clips within one end of said box frame, each of said spring clips including end flanges and a connecting web portion, said web portions being biased against each other between the walls of said box frame;
   a second pair of opposed inwardly convex centering spring clips, similar to said first pair and similarly mounted, within the other end of said box frame;
   said spring clips together defining the path of said sawblade within said storage sheath to guide said sawblade therealong midway between the walls thereof and to engage said sawblade for storage thereof.

* * * * *